United States Patent Office 2,843,497
Patented July 15, 1958

2,843,497

WAX COATINGS CONTAINING SYNERGISTIC ANTIOXIDANTS

Benjamin N. Stuckey and William M. Gearhart, Kingsport, Tenn., assignors to Eastman Kodak Company, Rochester, N. Y., a corporation of New Jersey Application February 23, 1955, Serial No. 490,114

2 Claims. (Cl. 106—287)

An objective of this invention is the preparation of a preservative flexible sheet packaging material for edible products such as lard, milk, cheese, etc. These packaging materials contain a synergistic combination of butylated hydroxyanisole (BHA) and butylated hydroxytoluene (BHT) which is incorporated into or onto the packaging material by means of an aqueous emulsion from which the water is evaporated or by means of a coating composition which contains either or both a petroleum wax and a polymerized olefin hydrocarbon, i. e. an alkylene polymer such as polyethylene. This invention also relates to these coatings or impregnating materials as such. The invention also pertains to alkylene polymers containing this synergistic antioxidant combination; these polymers (e. g. polyethylene) can be employed for any of the variety of uses for these versatile polymers in addition to their value as coatings for packaging materials. Other objects and features of this invention will become apparent hereinafter.

Paraffin and other types of mineral waxes, as well as various blends of waxes, have long been used by the packaging industry as coating materials for sheet materials which can be fabricated into containers required by various food packaging industries. The paper industry is accustomed to the practice of applying various solutions by rolling or pressing a liquid on one or both surfaces of paper and immediately driving off excessive water or other liquid solvents or otherwise hardening the liquid coating composition applied to the paper. Various antioxidants have been incorporated into such coating compositions for the purpose of stabilizing the packaging material as well as for preserving the contents of the packages when they are used to enclose edible products subject to deterioration. However, many of the antioxidants approved for food use are not suitable for such purposes, for example, propyl gallate and nordihydroguaiaretic acid (NDGA) are not satisfactory antioxidants for use in hydrocarbon waxes because of heat stability and color difficulties. Moreover, combinations of these antioxidants with other antioxidants have been shown to be unsatisfactory in various instances, for example, butylated hydroxytoluene (BHT) and propyl gallate cannot be satisfactorily combined.

A principal feature of our invention pertains to the provision of an especially advantageous antioxidant composition which can be employed both for wax stabilization and also for treating flexible sheet packaging materials such as paper and other base materials for wrapping edible products even when wax is not included in the treating composition.

Polyethylene and other similar materials have been advantageously used as laminates by the paper industry. They serve a purpose similar to that of mineral waxes and directly compete with them. The properties of polyethylene and its uses are well described in British Plastics, vol. 17, pp. 94–98, 146–151, and 208–228 (1945). The processes employing polyethylene accomplish lamination at lower temperature and therefore do not involve the higher temperatures which result in the rapid backdown of mineral waxes and mineral wax compositions containing polyethylene. This invention now provides stable mineral waxes and mineral wax compositions containing polymerized olefinic hydrocarbons. According to the applicants' discoveries it has been unexpectedly found that the novel synergistic antioxidant composition which is employed in this invention does not perform satisfactorily in pure polyethylene.

According to one embodiment of this invention we provide a process for preparing a preservative flexible packaging material for edible products which comprises treating a flexible base material with either of the following closely related compositions: (A) a stabilized hydrocarbon wax composition containing from about 0.001% to about 1% by weight of the composition of a synergistic antioxidant combination of from 1 to 6 parts by weight of tertiary butyl-p-hydroxyanisole and from 9 to 4 parts by weight of 3,5-ditertiarybutyl-p-hydroxytoluene, or (B) an aqueous emulsion comprising a dispersion in about 40 to about 10,000 parts by weight of water of about 60 parts by weight of a solution consisting essentially of (a) about 25 parts by volume of di-isobutyl adipate as a solvent, (b) about 25 parts by volume of glyceryl monostearate as an emulsifier, and (c) about 10 parts by volume of a synergistic antioxidant combination as defined above under (A).

The term tertiarybutyl-p-hydroxyanisole is intended to cover both isomers of this compound. Commercial antioxidants containing mixtures of these isomers are frequently referred to in the industry as BHA which is a term suggestive of the word butylated hydroxyanisole. The other component: 3,5-ditertiarybutyl-p-hydroxytoluene can be briefly designated as BHT which is suggestive of the word butylated hydroxytoluene. This compound is sometimes designated as 2,6-ditertiarybutyl-4-methylphenol. It is also sometimes referred to as dibutylated p-cresol. Throughout the remainder of this specification these antioxidant compounds will sometimes be referred to as BHA and BHT, respectively.

The term hydrocarbon wax includes mineral waxes as well as waxes prepared by the polymerization of ethylene, isobutylene and other alkylenes which have been found to polymerize to form wax-like polymers. These synthetic polymers can be combined with the mineral waxes derived from petroleum or other mineral sources so as to form hydrocarbon wax compositions. The packaging industry is well acquainted with the various types of hydrocarbon wax compositions which can be advantageously employed for the preparation of waxed packaging materials.

The antioxidant combination of this invention can also be advantageously incorporated on the surface or impregnated into flexible packaging materials by applying the antioxidant combination as an emulsion in water. The paper industry is equipped to apply various solutions by rolling or brushing a liquid on one or both surfaces of wrapping materials and immediately driving off excess water or other liquid solvents. Although both BHA and BHT antioxidants are quite soluble in various fats, oils, alcohols and other organic solvents, they are practically insoluble in water. Fats, oils, alcohols and various other organic solvents are not practical as solvents for the application of BHA or BHT to paper or other related wrapping materials for any of several reasons which include the following: (1) the effect which such solvents have on the texture of the paper or similar wrapping material, (2) the danger of fire caused by some of the more volatile alcohols and organic solvents, and (3) the toxicity to humans of many of these materials. Because of these limitations, as well as because of the economical factor involved, the most practical carrier for the antioxidant combination with which this invention is concerned is water except where the paper or other packaging base material is to be coated with a hydrocarbon wax composition as described above. The use of water as a carrier is accomplished through the preparation of an emulsion of the antioxidant combination in water.

It is not ordinarily practicable to formulate an emulsion at the spot where the application of the emulsion to the packaging material is to be accomplished. Therefore, this invention provides a means for formulating a concentrated emulsion which can be transported to the place where the application to packaging materials is to be performed. The emulsion can then be diluted to the proper strength and applied to the packaging material. It is therefore necessary that such an emulsion be stable in both concentrated form as well as when greatly diluted.

According to this specific embodiment of this invention the applicants have provided an emulsion of the antioxidant combination specified above which constitutes a stable concentrated aqueous emulsion adaptable for the coating of flexible sheet packaging base materials comprising a dispersion in about 40 parts by weight of water of about 60 parts by weight of a solution consisting essentially of (a) about 25 parts by volume of di-isobutyl adipate as a solvent, (b) about 25 parts by volume of glyceryl monostearate as an emulsifier, and (c) about 10 parts by volume of a synergistic antioxidant combination of from 1 to 6 parts by weight of tertiary butyl-p-hydroxyanisole and from 9 to 4 parts by weight of 3,5-ditertiarybutyl-p-hydroxytoluene.

Both BHA and BHT are solids at normal temperatures. It is therefore necessary to dissolve the antioxidant combination of BHA and BHT in a common solvent prior to the formation of the above-described stable concentrated aqueous emulsion. It has been found that di-isobutyl adipate is admirably suited as a solvent for both of these antioxidants. There are several other compounds which can also be employed as solvents for these two antioxidants, however, none of them produce the overall advantageous solvent action of di-isobutyl adipate from a practical point of view. Such other less satisfactory solvents which are not included within the scope of our invention but which can be employed less advantageously include butyl phthalyl butyl glycollate, various alkylaryl phosphates, dialkyl phthalates, various alkyl stearates, various alkyl adipates, propylene glycol mono-laurate, glyceryl mono-oleate, etc.

The emulsifier designated for use in accordance with our invention has been found to be especially suitable for the particular purpose of producing a stable emulsion in both concentrated form and when the emulsion is subsequently greatly diluted. This emulsifier is glyceryl monostearate. Numerous other emulsifiers are also well known to the art and can be less advantageously employed to produce emulsions of less satisfactory quality. Such less advantageous emulsifiers include gum arabic, gum tragacanth, glycol monolaurate, glyceryl mono- stearate, various glyceride emulsifiers produced by numerous manufacturers, and numerous other compounds commercially available as emulsifiers as well as many others not for sale but obviously known to have emulsifying properties.

The following examples will serve to further illustrate the invention with regard to the preparation of a stable concentrated aqueous emulsion adaptable for treating sheet packaging materials.

EXAMPLE I

The following ingredients were employed to form the emulsion:

| Ingredient: | Vol. percent |
|---|---|
| Di-isobutyl adipate | 25 |
| Butylated hydroxy toluene (BHT) | 12.5 |
| Butylated hydroxy anisole (BHA) | 12.5 |
| Glyceryl monostearate | 10 |
| Water | 40 |
|  | 100 |

The solvent, di-isobutyl adipate, was first heated to a temperature of 140° F. A quantity of BHA pellets amounting to half the volume of this solvent and a similar quantity of BHT pellets were then dissolved completely in the hot di-isobutyl adipate solvent. To this solution was then added the glyceryl monostearate emulsifier. The temperature was maintained at 140° F. and the mixture was maintained in constant agitation. The indicated amount of water was then violently agitated in a Premier dispensator (any similar agitator could be employed) at a temperature of about 76° F. The warm solution of antioxidant and emulsifier was then slowly added to the agitating water. Agitation was continued until most of the emulsion particles had reached a particular size of from 1 to 3 microns. This took about 30 minutes although other apparatus could be used to speed this up. Less efficient apparatus could be used over a longer period of time. The product obtained was a heavy paste emulsion. This emulsion was found to be stable under all temperature conditions which would be encountered during the transport of such a concentrated emulsion by common carrier to the locations where the emulsion would be employed for the treatment of paper. The finished concentrated paste emulsion was unaffected by light. However, it should be stored in air-tight containers under conditions which are not permitted to become excessively hot.

If a highly efficient agitator such as the Premier dispensator or similar agitator is not available the emulsion described in the above example can be prepared in any ordinary agitating device followed by passing the intermediately dispersed material through an homogenizer or a colloid mill which produces emulsion particles of a size from about 1 to about 3 microns.

EXAMPLE II

The procedure described in Example I was repeated exactly except that the following portions were employed:

| Ingredient: | Vol. percent |
|---|---|
| Di-isobutyl adipate | 25 |
| Butylated hydroxy toluene (BHT) | 20 |
| Butylated hydroxy anisole (BHA) | 5 |
| Glyceryl monostearate | 10 |
| Water | 40 |
|  | 100 |

Other similar concentrated emulsions can be prepared following the same procedure but employing variations in the proportion of the ingredients. Our invention is not specifically restricted to the precise proportions set forth but should not be allowed to deviate more than a few percent from those designated. When it is to be employed for coating flexible sheet packaging materials, the emulsion can be diluted up to and even more than 100 times with water employing only moderate care in accomplishing the dilution. The concentrated emulsion is quite stable at 100 to 1 dilutions. The diluted emulsions can be applied to one or both surfaces of the paper or incorporated into the paper through various means with which the industry is well acquainted. The apparatus and techniques involved are well known to those skilled in the art of manufacturing packaging materials.

When applying the antioxidant combination of this invention to flexible packaging materials in the form of a solution in a hydrocarbon wax, there is no need to resort to the use of aqueous emulsions of the type just described because the antioxidant combination is soluble in hydrocarbon waxes. When a hot wax composition is applied to flexible sheet packaging materials it can be solidified by permitting it to cool below the softening point. This is a more simple procedure than evaporating the water from an emulsion coated packaging material. For this reason, the use of a hydrocarbon wax coating composition has some advantages over the use of an aqueous emulsion. Moreover, packaging materials having water proof properties can best be produced by the employment of a hydrocarbon wax as a coating material for the packaging material. Paraffin and mixtures thereof with various polymerized olefins and various other types of waxes as well as various blends of wax have long been used in the packaging industry as coating materials for containers for the packaging of edible products. Most manufacturers of packaging materials apply wax mixtures in the liquid state at elevated temperatures such as those in the range of 150° F. to 220° F. At elevated temperatures, waxes tend to oxidize causing them to discolor, lose tensile strength, produce offensive odors, and otherwise lose their most advantageous physical and chemical properties. Waxes which have been partially oxidized or have otherwise deteriorated during the coating process have been found to break down much faster when subjected to intense sunlight, the presence of metals and other conditions which tend to catalyze the oxidative condition.

Oxidation of various waxes can be greatly reduced by the addition of certain phenolic types of antioxidants known to those familiar with the art. Prior to our invention the introduction of antioxidants into waxes intended for use in packaging edible products caused the hydrocarbon wax compositions to either discolor, develop a disagreeable odor, or to become otherwise unacceptable for food and drug packaging. Although the question of toxicity is an important problem to be overcome, it is also essential that the packaging materials have no disagreeable odors and that they have good color.

According to this embodiment of our invention, the use of the synergistic antioxidant combination described herein permits the formulation of hydrocarbon wax coating composition which has no odor attributable to the antioxidant combination and which is not associated with any deterioration of the color of the coating composition. Moreover, the coating composition contains nothing which is of questionable toxicity. Furthermore, the antioxidant combination of this invention permits the preparation of coating compositions containing hydrocarbon waxes which are more resistant to oxidation than the commercially available products now employed for this purpose. The following data illustrates the advantages of our invention in providing stabilized wax compositions and packaging materials coated therewith.

EXAMPLE III

Samples of paraffin wax, containing no polyethylene were stabilized with various concentrations of BHA, BHT and 50–50 combinations of the same. The wax was stabilized by heating to 170° F., adding the solid antioxidant and then agitating the mixture until all the antioxidant was completely dissolved. Stability tests were then made on the mixture using the standard 300° F. AOM test as described by Seubert, R. F., and Andrews, E. D., "Antioxidant for Waxes," Modern Packaging, December 1952, pages 153 and 154. The following results were obtained:

*The effect of BHA and BHT on paraffin*

| Antioxidant | Percent | Hours Stability at 300° F. | Synergism (in hours) |
|---|---|---|---|
| Control | None | 8.75 | |
| BHA | 0.001 | 18.50 | |
| BHA | 0.005 | 31.5 | |
| BHA | 0.010 | 40.5 | |
| BHT | 0.001 | 15.0 | |
| BHT | 0.005 | 47.0 | |
| BHT | 0.010 | 69.3 | |
| BHA+BHT | 0.0005+0.0005 | 28 | 11 |
| BHA+BHT | 0.0025+0.0025 | 78.8 | 39 |
| BHA+BHT | 0.005+0.005 | 122.3 | 67 |

EXAMPLE IV

Samples of paraffin wax containing 5 percent polyethylene were stabilized with various concentrations of BHA, BHT and combinations of 50 percent BHA and 50 percent BHT in the manner described above. This stabilized wax was coated on vegetable parchment paper with a laboratory roller to simulate a commercial waxing applicator. Samples of the waxed parchment were tested for their stabilizing effect on lard using the Schaal Oven method. This method is described in the subject invention report and by Bentz, R. W., "Antioxidants for Food Papers," Modern Packaging, vol. 27 (September 1953), 141–143. The results are as follows:

*The effect of stabilized waxed parchment on lard*

| Antioxidant | Percent | Days Stable at 145° F. | Synergism (in days) |
|---|---|---|---|
| Control | Control | 3 | |
| BHA | 0.0025 | 5.5 | |
| BHA | 0.005 | 6 | |
| BHA | 0.010 | 6.5 | |
| BHA | 0.020 | 7.5 | |
| BHA | 0.030 | 8.5 | |
| BHA | 0.040 | 9.5 | |
| BHA | 0.050 | 10 | |
| BHT | 0.0025 | 5 | |
| BHT | 0.005 | 6 | |
| BHT | 0.010 | 7 | |
| BHT | 0.020 | 8 | |
| BHT | 0.030 | 9.5 | |
| BHT | 0.040 | 11 | |
| BHT | 0.050 | 10.5 | |
| BHA+BHT | 0.0025 | 6.5 | 1.25 |
| BHA+BHT | 0.005 | 7.5 | 1.50 |
| BHA+BHT | 0.010 | 8.5 | 1.75 |
| BHA+BHT | 0.020 | 9.5 | 1.75 |
| BHA+BHT | 0.030 | 12.0 | 3.00 |
| BHA+BHT | 0.040 | 12.0 | 1.75 |
| BHA+BHT | 0.050 | 12.0 | 1.75 |

EXAMPLE V

Samples of paraffin wax containing 5 percent polyethylene were stabilized with various concentrations of BHA, BHT and 50–50 combinations of the same using the same method described in Example III. Stabilities were determined using the 300° F. AOM method described above. The effect of the antioxidant on the stability of the wax may be seen in the following table.

*The effect of BHA and BHT antioxidants on paraffin-polyethylene wax*

| Antioxidant | Percent | Hours Stability at 300° F. | Synergism (in hours) |
| --- | --- | --- | --- |
| Control | Control | 4.5 | |
| BHA | 0.0025 | 17.0 | |
| BHA | 0.0050 | 26.0 | |
| BHA | 0.010 | 36.0 | |
| BHA | 0.020 | 44.5 | |
| BHA | 0.030 | 60.0 | |
| BHA | 0.040 | 67.5 | |
| BHA | 0.050 | 69.5 | |
| BHT | 0.0025 | 16 | |
| BHT | 0.0050 | 26.5 | |
| BHT | 0.010 | 41.5 | |
| BHT | 0.020 | 68 | |
| BHT | 0.030 | 85 | |
| BHT | 0.040 | 90 | |
| BHT | 0.050 | 133 | |
| BHA + BHT | 0.0025 | 30.5 | 14 |
| BHA + BHT | 0.0050 | 41 | 15 |
| BHA + BHT | 0.010 | 60 | 21 |
| BHA + BHT | 0.020 | 93 | 37 |
| BHA + BHT | 0.030 | 118 | 36 |
| BHA + BHT | 0.040 | 125 | 46 |
| BHA + BHT | 0.030 | 130 | 29 |

The preceding tables include a column which shows the degree of synergism (S) which is defined as: $S = A - \frac{1}{2}(B+C)$ wherein A is the stability of paraffin containing the antioxidant combination of BHA+BHT, B is the stability of paraffin containing BHA in quantities equal to that of "A" and C represents the stability of paraffin containing BHT in quantities equal to that of "A."

The Schaal oven method referred to above is a modification of the usual Schaal oven test wherein paper is placed in jars and covered with the test material. The test results tabulated above were obtained from the storage of jars at 145° F., containing the lard and treated paper which was tested every twelve hours organoleptically for rancidity. The results are shown in days of stability at 145° F.

As mentioned hereinabove the hydrocarbon waxes employed can include various percentages of polyethylene and other alkylene polymers such as polymerized isobutylene. It is ordinarily considered that the paraffin wax should constitute a fairly substantial proportion of the coating composition when applied to packaging materials. For the purposes of this invention we consider that the amount of paraffin or other mineral wax should constitute at least 10% of the total composition. This is based upon the fact that the antioxidant combination with which this invention is concerned is not effective in a polymerized olefin such as polyethylene.

The coating materials with which this invention is concerned are especially advantageous for application to various grades of paper and paper board for the manufacture of butter and margarine wrappers, containers for ice cream, milk, cheese, cottage cheese, etc., bags made from various grades of glassine paper for candy, pop corn, potato chips, etc. Moreover, chip board coated with a stabilized hydrocarbon wax can be advantageously employed in the preparation of tubes, trays, etc. for the storage of edible products. Furthermore, various grades of sulfite, parchment and other papers can be used as liners and food cartons for numerous types of edible materials containing fatty constituents. Various kraft papers can also be coated with the wax compositions of this invention and fabricated into containers such as boxes and bags for edible materials such as animal feeds, fatty materials, etc. The materials which can be stored in the wrapping and packaging materials of this invention include inedible fatty and oily materials which tend to deteriorate by the formation of rancidity. Such materials are used in the paint industry and for other purposes. The materials which can be stored in the wrappers and containers provided by our invention include animal, vegetable, fish and mineral oils, waxes, fats, greases and the like, e. g. lard, cottonseed oil, peanut oil, lanolin, mutton tallow and grease, beef tallow, white and yellow greases, linseed oil, cod liver oil, castor oil, olive oil, coconut oil, palm oil, corn oil, paraffin oil, carnauba wax, paraffin wax, beeswax, lard oil, sperm oil, transformer oils, citrus oils such as lemon oil, mono-, di- and triglycerides of various saturated and unsaturated fatty acids, hydrogenated fats and oils, etc., as well as materials containing a substantial proportion of any of the waxes, fats or oils, e. g. certain animal feeds, paint vehicles, furniture polishes, floor waxes, automobile polishes, cottage cheese, milk, milk solids, powdered or whole eggs, egg yolks, mayonnaise, butter margarine, etc.

We claim:

1. A stable concentrated aqueous emulsion adaptable for the coating of flexible sheet pacakaging base materials consisting essentially of a dispersion in about 40 parts by weight of water of about 60 parts by weight of a solution consisting essentially of (a) about 20 parts of volume of di-isobutyl adipate as a solvent, (b) about 25 parts by volume of glyceryl monostearate as an emulsifier, and (c) about 10 parts by volume of a synergistic antioxidant combination of from 1 to 6 parts by weight of tertiary butyl-p-hydroxyanisole and from 9 to 4 parts by weight of 3,5-ditertiary butyl-p-hydroxytoluene.

2. A composition as defined in claim 1 wherein the synergistic antioxidant combination consists of approximately equal quantities of the two constituents designated in (c).

References Cited in the file of this patent

UNITED STATES PATENTS

| 691,952 | Little | Feb. 28, 1902 |
| 2,628,172 | Jenett | Feb. 10, 1953 |
| 2,658,004 | Eldridge | Nov. 3, 1953 |
| 2,658,835 | Wymbs | Nov. 10, 1953 |
| 2,704,746 | Chenicek | Mar. 22, 1955 |
| 2,715,073 | Lowry | Aug. 9, 1955 |
| 2,755,193 | Rumberger | July 17, 1956 |

FOREIGN PATENTS

| 621,923 | Great Britain | Apr. 22, 1949 |
| 658,168 | Great Britain | Dec. 3, 1952 |
| 685,168 | Great Britain | Dec. 31, 1952 |